Nov. 29, 1932.                C. W. HANSEN             1,889,600
POWER TRANSMISSION MECHANISM
Filed Feb. 3, 1930
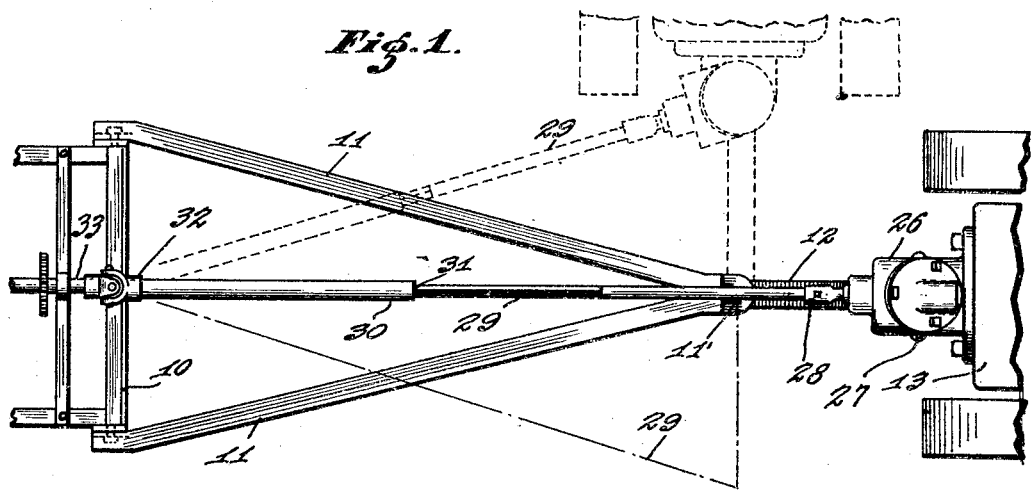
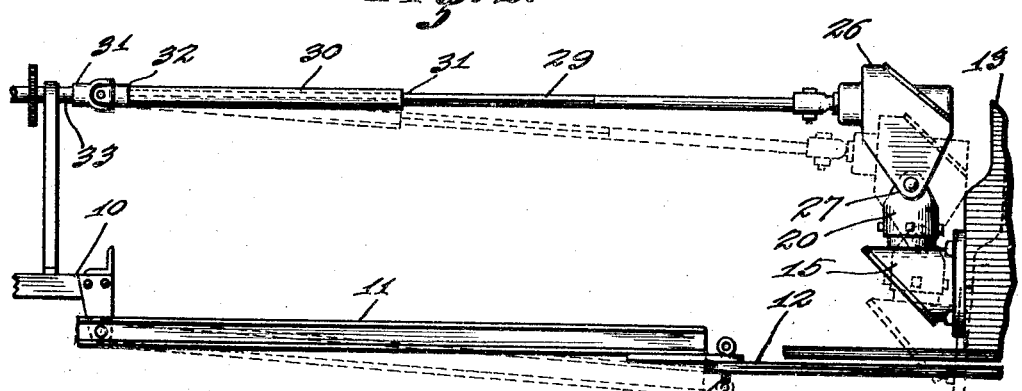
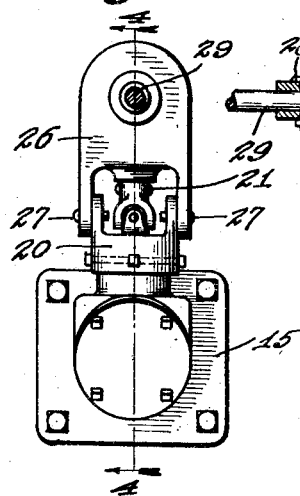
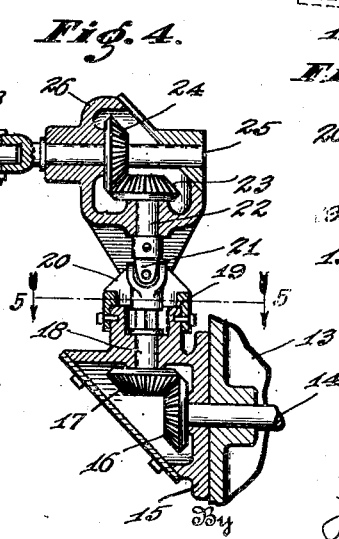
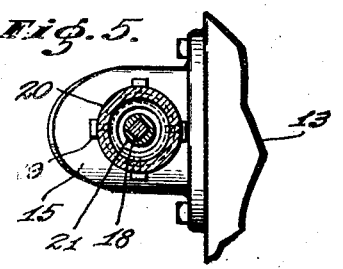
Inventor
CHARLES W. HANSEN,
By James A. Walsh.
Attorney Patented Nov. 29, 1932

1,889,600

UNITED STATES PATENT OFFICE

CHARLES W. HANSEN, OF RACINE, WISCONSIN, ASSIGNOR TO J. I. CASE COMPANY, OF RACINE, WISCONSIN, A CORPORATION

POWER TRANSMISSION MECHANISM

Application filed February 3, 1930. Serial No. 425,367.

My invention relates to power take-off mechanisms for use particularly in connection with agricultural machinery and tractors, whereby the latter, which propels the machine or implement attached thereto, also transmits power to the actuating elements of the machine, for example, the header cutting knives, conveyer and threshing mechanisms of a combination harvester-thresher; my object being to provide an improved power take-off for such purposes which will be sufficiently flexible and highly efficient at all times irrespective of the varying positions assumed by the tractor in relation to the drawn machine or vice versa when traversing rough or irregular ground, turning said elements, and otherwise.

In the accompanying drawing, forming part hereof, Figure 1 is a plan view of my improved power take-off connecting a tractor and a harvesting machine, the latter elements being shown in fragment; Fig. 2, a side elevation of the parts shown in Fig. 1; Fig. 3, an enlarged detail as seen when looking toward the rear of the tractor; Fig. 4, a detail section taken on the dotted line 4—4 in Fig. 3; and Fig. 5 is a section taken on the dotted line 5—5 in Fig. 4.

In the drawing the numeral 10 indicates a harvester part to which a draw-bar 11 is pivotally connected and at its forward end, at 11', is detachably secured to the draw-bar 12 of the tractor 13 in any well known or desired manner. The tractor, as is common, is provided with the necessary clutch and other parts (not shown) associated with and rotating a power take-off shaft 14, Fig. 4, the rear end of which terminates in a casing 15 and is equipped with a pinion 16 which engages and drives pinion 17 supported on a shaft 18 mounted in the upper end of the casing 15. At the upper end of said casing I mount a support 20, the lower portion of which is rotatably connected, at 19, to casing 15, so that said casing is free to revolve in a horizontal plane. In Fig. 4 it will be observed that the upper end of shaft 18 is square and upon which I slidably attach a universal joint 21 the upper member of which is secured to shaft 22 having a gear 23 integrally formed or connected therewith. The gear 23 meshes with and drives gear 24, which latter in turn drives shaft 25 connected thereto, said gears being enclosed in a housing 26, which latter is pivotally attached, at 27, Figs. 2 and 3, to the support 20 so that it may swing in a vertical direction. It will therefore be seen that by said pivotal connections 27, the universal joint 21 connecting shafts 18 and 22, and the revolvable support 20 mounted upon casing 15, the driving and driven parts are flexibly connected in a stable manner so that there will be no disarrangement thereof during the varied movements of the connections incident to the irregular motion of the tractor and drawn machine when encountering ground inequalities.

On the rear end of shaft 25 I provide a connection 28 to which the drive shaft 29 is removably attached and within convenient reach of the tractor operator for the purpose. A portion of said shaft 29 is square and telescopically connected to shaft 30, at 31, so as to be self-adjustable to the variations in length caused by turning the vehicles and when they traverse ground irregularities, the tubular shaft 30 being attached to the harvesting machine by a universal joint 32 and which forms a flexible connection between said shaft 30 and the main shaft 33 of the machine.

As indicated by the dotted lines 29 in Fig. 1, the power takeoff mechanisms are equally efficient under different conditions either as the tractor is pulling in a direct line as shown by the full lines, or when pulling at an angle when the tractor is turned to either side of the draw-bar 11, the vertical connection 11' between the draw bars 11, 12, and between the shaft sections 33 and 29, permitting free lateral swinging of the tractor and the power take-off shaft. In circumstances where the tractor enters depressions, as indicated by the dotted lines in Fig. 2, the gear housings 15 and 26, pivoted at 27, and the universal joint 32, together with the pivotally connected draw-bar, permit varied vertical movements of the vehicles and their connections to meet the conditions stated. Therefore, with the vertical pivot connection and the casing 15 revolving in the support 20 providing for lateral swinging of the power take-off shaft, and the pivotally connected power take-off shaft and machine draw-bar permitting the vertical swinging of the connected parts, I provide a highly efficient and flexible driving connection between a tractor and agricultural machine capable of self-adjustment under the many varying ground conditions encountered in field operations.

I claim:

1. In a device of the character described, a casing, means for attaching the same to a tractor, a support mounted upon and in which said casing revolves, a vertical shaft in the casing, a universal joint telescopically mounted on said shaft and having a gear at its upper end, a vertically swinging housing enclosing said gear and pivotally connected to said support, a horizontal shaft supported in said housing, a gear on said shaft engaging the gear of said vertical shaft, and means extending rearwardly through a tractor for driving the vertical shaft to rotate said horizontal shaft.

2. In a device of the character described, a casing having an upwardly projecting end, a support connected to said end in which the casing revolves, a housing pivotally mounted on the support and vertically adjustable in relation thereto, a vertical shaft in the casing having a gear on its lower end, a universal joint adjustably connected to said shaft, a pinion in the housing and mounted on said universal joint, a horizontal shaft in the housing and having a gear engaging said pinion, and means for driving the shaft in the casing for actuating said universal joint to rotate the horizontal shaft.

3. In a device of the character described, a casing, a support in which said casing revolves, a housing pivotally connected to the opposite sides of the support to swing vertically, a vertical shaft in the casing and housing including a universal joint the pivot of which normally coincides with the pivotal connection of said housing, a horizontal shaft in the housing driven by said vertical shaft and following the vertical movements of the housing, and means in the casing for driving said vertical and horizontal shafts.

4. The combination, with a tractor, of a rearwardly extending driving shaft, a driven shaft engaging therewith, a casing secured to the rear end of the tractor and enclosing the ends of said shafts, a support mounted upon and in which said casing revolves, a vertically swinging housing pivotally connected to said support, a vertical shaft in said housing including a gear, a universal connection between the driven shaft and said vertical shaft, and a power transmitting shaft in the housing having a gear thereon engaging and driven by the vertical shaft gear.

In testimony whereof I affix my signature.

CHARLES W. HANSEN.